United States Patent [19]
Anton et al.

[11] Patent Number: 6,020,400
[45] Date of Patent: Feb. 1, 2000

[54] INK JET INKS CONTAINING EMULSION POLYMER ADDITIVES STABILIZED WITH STRUCTURED POLYMERS

[75] Inventors: Waifong Liew Anton; Milan Bohuslav Bednarek, both of Wilmington; Robert Paul Held, Newark, all of Del.; Sheau-Hwa Ma, Chadds Ford, Pa.; Joseph Edward Reardon, Wilmington, Del.; Arthur Charles Shor, Concordville, Pa.; Harry Joseph Spinelli, Wilmington, Del.; Soodabeh Tronson, San Carlos, Calif.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/774,989

[22] Filed: Dec. 27, 1996

[51] Int. Cl.[7] .................................................. C09D 11/10

[52] U.S. Cl. .......................... 523/161; 523/201; 524/501; 524/504; 524/505; 260/DIG. 38; 106/31.13; 106/31.25

[58] Field of Search ..................................... 523/161, 201; 524/501, 504, 505; 106/20 D; 260/DIG. 38

[56] References Cited

U.S. PATENT DOCUMENTS

| | | | |
|---|---|---|---|
| 5,021,469 | 6/1991 | Langerbeins et al. | 523/201 |
| 5,085,698 | 2/1992 | Ma et al. | 106/20 D |
| 5,212,251 | 5/1993 | Lorah et al. | 525/279 |
| 5,219,945 | 6/1993 | Dicker et al. | 525/276 |
| 5,519,085 | 5/1996 | Ma et al. | 524/503 |

FOREIGN PATENT DOCUMENTS

| | | | |
|---|---|---|---|
| 0 571 190 A2 | 11/1993 | European Pat. Off. | |
| 3-79679 | 4/1991 | Japan | C09D 11/00 |
| 4-275315 | 9/1992 | Japan | C08F 257/00 |
| WO 94/10235 | 5/1994 | WIPO | |

*Primary Examiner*—Terrel Morris
*Assistant Examiner*—John J. Guarriello
*Attorney, Agent, or Firm*—Joseph A. Tessari

[57] ABSTRACT

Inks for ink jet printers containing an aqueous carrier medium; a pigment; a polymeric dispersant; and an emulsion polymer additive stabilized with a structured polymer are stable, have low viscosity, exhibit excellent print quality, provide excellent smear resistance after drying, have good decap and crusting time, and also demonstrate good charging stability when used in continuous flow printers.

8 Claims, No Drawings

INK JET INKS CONTAINING EMULSION POLYMER ADDITIVES STABILIZED WITH STRUCTURED POLYMERS

BACKGROUND OF THE INVENTION

This invention relates to aqueous inks for ink jet printers and, more particularly, to aqueous ink jet inks containing emulsion polymers stabilized with structured polymers.

Ink jet printing is a non-impact printing process in which droplets of ink are deposited on a substrate such as paper or transparency film in response to an electronic signal. Low cost and high quality of the output, combined with relatively noise free operation, have made ink jet printers a popular option to other types of printers used with computers.

Both dyes and pigments have been used as ink colorants for ink jet printers. The dye-based inks while in general superior in color properties have several disadvantages as compared to pigment based inks. The dyes are usually water soluble and remain so after drying on the substrate. They are easily redissolved by water spills, and the image smears on contact with felt pen markers. In addition, the dyes exhibit poor light stability relative to pigments and are known to fade even under office lighting. Thus, dye-based inks are often unsuitable for use in applications requiring moisture resistance and greater light stability. The pigments are preferred colorants provided the pigment dispersion can be made resistant to flocculation and settling.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the pigment will tend to smear upon exposure to moisture.

Further, continuous flow printers that function by charging the ink may cause flocculation of the pigment based inks.

There exists a need for ink jet inks which have good water resistance and smear fastness. In particular, with pigment based inks used in continuous flow systems, there is a need to maintain the charging stability of the dispersion while improving water and smear fastness.

SUMMARY OF THE INVENTION

The present invention provides an ink jet ink comprising:
(a) an aqueous carrier medium;
(b) a colorant; and
(c) an emulsion polymer additive stabilized with a structured polymer.

The inks of the invention are stable, have low viscosity, exhibit excellent print quality, provide excellent smear resistance after drying and good decap or crusting time. They may be used with a variety of ink jet printers such as continuous, piezoelectric drop-on-demand and thermal or bubble jet drop-on-demand, and are particularly adapted for use in thermal ink jet printers. These inks may also be useful in air brush printing devices.

DETAILED DESCRIPTION OF THE INVENTION

The invention provides an ink jet ink composition which is particularly suited for use in ink jet printers in general, and thermal and continuous flow ink jet printers in particular. These inks are stable over long periods, both in storage and in the printer. The disperse dye-based inks comprise water, a disperse dye stabilized by dispersants, usually structured polymeric dispersants and an emulsion polymer additive stabilized with a structured polymer. The dye based inks comprise an aqueous carrier medium, a dye and optionally an emulsion polymer additive stabilized with a structured polymer. The inks may be adapted to the requirements of a particular ink jet printer to provide a balance of light stability, smear resistance, viscosity, surface tension, high optical density, crust resistance and charge stability, where appropriate.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

Colorants useful in the ink compositions of this invention include both dyes and pigments. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments:

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dyes:

The dyes may be those that are soluble in the aqueous carrier medium or those that are insoluble, the latter being refereed to herein as "dispersed dyes."

The color and amount of disperse dye used in the ink is largely a function of choice, being primarily dependent upon the desired color of the print achieved with the ink, the purity of the dye, and its strength. Low concentrations of dye may not give adequate color vividness. High concentrations may result in poor printhead performance or unacceptably dark colors. The disperse dye may be present in the amount of 0.01 to 20%, by weight, preferably 0.05 to 8%, by weight, more preferably 1 to 5%, by weight, based on the total weight of the ink. Disperse dyes that may be useful in this invention are disclosed in U.S. Pat. No. 5,053,495, U.S. Pat. No. 5,203,912, U.S. Pat. No. 5,102,448, etc.

Conventional dyes such as anionic, cationic, amphoteric and non-ionic dyes are useful in this invention. Such dyes are well known to those of ordinary skill in the art. Anionic dyes are those dyes which in aqueous solution yield colored anions and cationic dyes are those which in aqueous solution yield colored cations. Typically anionic dyes contain carboxylic or sulfonic acid groups as the ionic moiety. Cationic dyes usually contain quaternary nitrogen groups.

The types of anionic dyes most useful in this invention are, for example, Acid, Direct, Food, Mordant, and Reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

The color and amount of dye used in the ink composition is largely a function of choice, being primarily dependent upon the desired color of the print achieved with the ink, the purity of the dye and its strength. The dye is typically present in the amount of 0.01 to 20%, by weight, preferably 0.05 to 8%, more preferably 1 to 5%, based on the total weight of the ink.

Dispersants

Polymeric dispersants suitable for practicing the invention include random polymers and structured polymeric dispersants such as block copolymers and branched-type polymers. The polymers may be anionic, cationic, or non-ionic in nature.

Random polymers are not as effective in stabilizing pigment dispersions as structured polymers and, therefore, are not preferred. However, a random polymer which has both hydrophilic moieties for aqueous solubility and hydrophobic moieties for interaction with the pigment and an average molecular weight to contribute to the dispersion stability can be effectively used to practice the present invention. Such polymeric dispersants are disclosed in U.S. Pat. No. 4,597,794.

The block polymers suitable for practicing the invention are AB, BAB and ABC type structures. A block polymer which has hydrophobic and hydrophilic blocks and balanced block sizes to contribute to the dispersion stability may be advantageously used to practice this invention. Functional groups can be built into the hydrophobic (pigment binding) block for stronger specific interactions between the pigment and the polymer dispersant to give an improved dispersion stability. A detailed description of these polymers can be found in the aforementioned U.S. Pat. Nos. 5,085,698 and 5,272,201 and in EPO application 0 556 649 A1.

It may be necessary to make salts of either the functional groups contained in the polymer to render it soluble in the aqueous carrier medium. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; 2-amino-2-methyl-1-propanol; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine, 2-amino-2-methyl-1-propanol, and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymer that contains both an acid group and an amino group, may be used as is or can be neutralized with either addition of acid or base.

The amount of the dispersant polymer depends on the structure, molecular weight and other properties of the dispersant polymer, and on the other components of the ink composition. The block polymers that are selected in practicing the invention have number average molecular weight of below 20,000, preferably below 10,000, and typically in the range of 1,500 to 6,000.

The polymeric dispersant may be present in the amount of 0.1 to 25%, preferably 0.1 to 8% by weight, based on the total weight of the ink composition. If the amount is too high, it will be difficult to maintain the desired ink viscosity. Dispersion stability will be adversely affected if insufficient polymer is present.

Emulsion Polymer Additive

The emulsion polymer additive may be prepared from acrylic or methacrylic monomers; vinyl type monomers such as vinyl acetate, vinyl chloride, etc.; maleic acid or maleic anhydride; styrene; itaconic acid; N-vinyl pyrrolidone; acrylamides; methacrylamides; and derivatives thereof. Some representative acrylic or methacrylic monomers include methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, ethoxytriethyleneglycol methacrylate (ETEGMA), 2-ethoxyethyl methacrylate, methacrylonitrile, 2-trimethylsiloxyethyl methacrylate, glycidyl methacrylate(GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethyl-siloxyethyl acrylate, glycidyl acrylate, p-tolyl acrylate, sorbyl acrylate, methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Preferred are emulsions prepared from methyl methacrylate, butyl methacrylate, 2-ethylhexyl methacrylate, methyl methacrylate with butyl methacrylate, methacrylic acid or dimethylaminoethyl methacrylate.

The emulsion polymer may also contain small amounts of crosslinking monomers like ethylene glycol dimethacrylate or ethylene glycol triacrylate, etc.

The emulsion polymer may also contain a hydrophilic monomer such as $CH_2=C(X)(Y)'$, wherein X is H or $CH_3$ and Y' is C(O)OH, $C(O)NR_2R_3$, $C(O)OR_4NR_2R_3$, $C(O)OR_5$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the emulsion to render it, or its salt, completely water soluble.

Structured Polymer Stabilizer

The emulsion polymers are stabilized with structured polymers selected from the group consisting of block polymers, such as diblock and triblock polymers, and graft polymers. Useful diblock polymers are disclosed in U.S. Pat. No. 5,085,698 and useful triblock polymers are disclosed in U.S. Pat. No. 5,519,085.

The emulsion polymer additive with structured polymer stabilizer may be present in the amount of 0.01 to 20% solids by weight, preferably 0.01 to 5% solids by weight, for thermal ink jet printing applications, and 5.1 to 20% solids by weight, for continuous flow, piezo and air brush printing applications, based on the total weight of the ink composition.

Other Ingredients

Consistent with the requirements of the invention, various types of additives may be used to optimize the properties of the ink compositions for specific applications. Surfactants may be used to alter surface tension as well as maximize penetration. However, the type of surfactants and the amounts used need to be carefully selected to avoid pigment dispersion destabilization or to negate the benefits of the present inks.

As is well known to those skilled in the art, biocides may be used in the ink compositions to inhibit growth of microorganisms. Sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions as desired.

Ink Properties And Preparation

The ink compositions of the invention may be prepared in a similar manner as other ink jet inks. For inks containing an insoluble colorant, the ink is prepared by first premixing the selected colorant(s) and polymeric dispersant and then dispersing or deflocculating the colorant. The dispersing step may be accomplished in a horizontal mini mill, a ball mill, an attritor, or by passing the mixture through a plurality of nozzles within a liquid jet interaction chamber at a liquid pressure of at least 5000 psi to produce a uniform dispersion of the colorant in the aqueous carrier medium. Dye based inks are prepared in a well agitated vessel rather than in dispersing equipment.

It is generally desirable to make the dispersion in concentrated form, which is subsequently diluted with a suitable liquid to the appropriate concentration for the desired viscosity, color, hue, density and print area coverage for the particular application.

For thermal ink jet printers, the ink drop velocity, drop volume, and stream stability are greatly affected by the surface tension and the viscosity of the ink. For continuous flow ink jet printers, the ink drop velocity, drop volume, and stream stability are greatly affected by the surface tension, viscosity and the charge stability of the ink. Ink jet inks suitable for use with ink jet printing systems should have a surface tension in the range of about 20 dyne/cm to about 80 dyne/cm and, more preferably, in the range 25 dyne/cm to about 65 dyne/cm at 20° C. Acceptable viscosities are no greater than 20 cP, and preferably in the range of about 1.0 cP to about 10.0 cP at 20° C.

EXAMPLES

The invention will now be further illustrated by, but not limited to, the following examples, in which parts and percentages are by weight unless otherwise noted.

Emulsion Polymer Stabilizer 1:

A 12-liter flask was equipped with a mechanical stirrer, thermometer, N2 inlet, drying tube outlet, and addition funnels. Tetrahydrofuran THF, 4002 g, and p-xylene, 7.7 g, were charged to the flask. The catalyst tetrabutyl ammonium m-chlorobenzoate, 2.0 ml of a 1.0 M solution in acetonitrile, was then added. Initiator, 1-methoxy-1-trimethylsiloxy-2-methyl propene, 155.1 g (0.891 M) was injected. Feed I [2-dimethylaminoethyl methacrylate, 2801 g (17.8 M)] was started at 0.0 minutes and added over 45 minutes. One hundred minutes after Feed I was completed (over 99% of the monomers had reacted), Feed II [butyl methacrylate, 2045 g (14.4 M) was started and added over 30 minutes. At 400 minutes, 310 g of dry methanol were added to the above solution and distillation begun. A total of 1725 g of solvent were removed. Isopropanol, 1783 g, was added after completion of the distillation.

This made a butyl methacrylate//dimethylaminoethyl methacrylate (20//20) diblock polymer at 49.6% solids. The polymer was then neutralized with the addition of concentrated phosphoric acid, 2052 g (17.8 M); and inverted into water to make a 15% solution of polymeric salt.

Emulsion Polymer Stabilizer 2:

A 12 liter flask was equipped with a stirrer, thermometer, N2 inlet, drying tube outlet and addition funnels. Tetrahydrofuran ("THF"), 3004 g, and mesitylene, 7.6 g were charged to the flask. The catalyst, tetrabutyl ammonium m-chlorobenzoate, 3.0 ml of a 1.0 M solution in acetonitrile, was then added. The initiator, 1,1-bis(trimethylsiloxy)-2-methylpropene, 240 g, was injected. Feed I (tetrabutyl ammonium m-chlorobenzoate, 3.0 ml, of a 1.0 M solution in acetonitrile) was started and added over 150 minutes. Feed II (trimethylsilyl methacrylate, 1636 g) was started at 0.0 min and added over 30 minutes. Fifty minutes after Feed II was completed, Feed III (butyl methacrylate, 1469 g, and ethoxytriethyleneglycol methacrylate, 1274 g) was started and added over 30 minutes. At 320 minutes, 663 g of dry methanol were added to the above solution and distillation was started. During the first stage of distillation 624.0 g of material were removed from the flask. Methanol, 332 g, was added. Distillation continued and a total of 1239 g of solvent were removed.

This made a butyl methacrylate/ethoxytriethyleneglycol methacrylate//methacrylic acid AB block polymer (5/10//10) of 5140 Mn and 50.8% solids. 701 g of the polymer were neutralized with 127 g of KOH (45% solution) and the solution was diluted with 2673 g of deionized water.

Emulsion Polymer Stabilizer 3:

A 12 liter flask was equipped with a stirrer, thermometer, N2 inlet, drying tube outlet and addition funnels. Tetrahydrofuran ("THF"), 3027 g, and p-xylene, 6.2 g were charged to the flask. The catalyst, tetrabutyl ammonium m-chlorobenzoate, 2.5 ml of a 1.0 M solution in acetonitrile, was then added. The initiator, 1,1-bis(trimethylsiloxy)-2-methylpropene, 234.4 g, was injected. Feed I (tetrabutyl ammonium m-chlorobenzoate, 2.5 ml of a 1.0 M solution in acetonitrile) was started and added over 150 minutes. Feed II (trimethylsilyl methacrylate, 1580 g) was started at 0.0 min and added over 30 minutes. One hundred and twenty minutes after Feed II was completed, Feed III (butyl methacrylate, 1425 g and methyl methacrylate, 503 g) was started and added over 30 minutes. At 320 minutes, 650 g of dry methanol were added to the above solution and distillation was started. During the first stage of distillation 1250.0 g of material were removed from the flask. I-propoanol, 1182 g, was added. Distillation continued and a total of 2792 g of solvent were removed.

This made a butyl methacrylate/methyl methacrylate//methacrylic acid AB block polymer (10/5//10) of 2900 Mn and 50.5% solids. 396 g of the polymer, 68 grams of 2-amino-2-methyl-1-propanol ("AMP") and 1536 g of deionized water were mixed together to form an aqueous solution of the polymer.

Dispersant Polymer 1:

A 12-liter flask was equipped with a mechanical stirrer, thermometer, N2 inlet, drying tube outlet, and addition funnels. Tetrahydrofuran THF, 4002 g, and p-xylene, 7.7 g, were charged to the flask. The catalyst tetrabutyl ammonium m-chlorobenzoate, 2.0 ml of a 1.0 M solution in acetonitrile, was then added. Initiator, 1-methoxy-1-trimethylsiloxy-2-methyl propene, 155.1 g (0.891 M) was injected. Feed I [2-dimethylaminoethyl methacrylate, 2801 g (17.8 M)] was started at 0.0 minutes and added over 45 minutes. One hundred minutes after Feed I was completed (over 99% of the monomers had reacted), Feed II [benzyl methacrylate, 1568 g (8.91 M) was started and added over 30 minutes. At 400 minutes, 310 g of dry methanol was added to the above solution and distillation begun. A total of 1725 g of solvent were removed. Isopropanol, 1783 g, was added after completion of the distillation.

This made a benzyl methacrylateh/dimethylaminoethyl methacrylate (10//20) diblock polymer at 49.6% solids with Mn 5000.

Dispersant Polymer 2:

A 1-liter flask was equipped with a mechanical stirrer, thermometer, N2 inlet, drying tube outlet, and addition funnels. Tetrahydrofuran (THF), 83 g, and mesitylene, 0.1 g, were charged to the flask. The catalyst tetrabutyl ammonium m-chlorobenzoate, 230 μl of a 1.0 M solution in THF, was then added. Initiator, 1,1-bis(trimethylsiloxy)-2-methyl propene, 5.0 g (0.020 mol), was injected. Feed I [tetrabutyl ammonium m-chlorobenzoate, 230 μl of a 1.0 M solution in THF] was started and added over 130 minutes. Feed II [trimethylsilyl methacrylate, 40.86 g (0.250 mol)] was started at 0.0 minutes and added over 30 minutes. Thirty minutes after Feed II was completed (over 99% of the monomer had reacted), Feed II [benzyl methacrylate, 56.90 g (0.323 mol)], was started and added over 60 minutes. Ten minutes after Feed III was completed (over 99% monomers had reacted), Feed IV [ethoxytriethylene glycol methacrylate, 21.21 g (0.0862 mol)] was started and added over 30 minutes. At 150 minutes, 12 g of methanol were added. Then 98 g of solvents and trimethylmethoxysilane were stripped out and replaced with 153 g 2-pyrrolidone.

This made a ethoxytriethylglycol methacrylate//benzyl methacrylate//methacrylic acid (4115/1112) triblock polymer at 40% solids. The polymer was neutralized to 80% by adding 11 grams 45% aqueous potassium hydroxide solution to 100 grams block copolymer solution and mixing until a homogeneous solution was obtained. After neutralization the material was reduced to approximately 10% solids with 289 grams of deionized water. The pH was 8.

Pigment Dispersion 1:

A cyan pigment dispersion was prepared by thoroughly mixing the following ingredients:

| Ingredient | Grams |
| --- | --- |
| Dispersant Polymer 1 | 203.2 |
| Heliogen ® 7072DD PB15 pigment* | 150.0 |
| 1-propanol | 450.0 |

*BASF, Parsippany, NJ

This mixture was then charged to a 2 roll mill and process for 45 minutes. This made a pigment dispersion chip that contained 60% pigment and 40% polymer. It had a pigment-to-dispersant ratio ("P/D") of 1.5/1. This 2 roll mill chip was then neutralized by mixing 5.47 grams of 86.0% phosphoric acid, 33.3 grams of the dispersion and 161.23 grams of deionized water to make an aqueous pigment concentrate.

This made an aqueous, cyan pigment concentrate that contained 10% pigment and had 90 mole % of the amine groups from the polymer neutralized with phosphoric acid.

Pigment Dispersion 2:

A 1-liter beaker was equipped with a mechanical stirrer. Into the beaker was placed 94 g of the polymer from Dispersant Preparation 2 and 13 g water. With stirring, 18.7 g FW 18 black pigment (Degussa Corp., Ridgefield Park, N.J.) were added in small portions. When the mixture was thoroughly combined, it was passed through a model M-110F Microfluidizer (Microfluidics Corp., Newton, Mass.) five times. The average particle size after microfluidization was 108 nm; and pigment concentration of the dispersion was 15%.

Emulsion 1:

An emulsion polymer of n-butyl methacrylate stabilized with Stabilizer Polymer 1 was prepared as follows:

| Ingredient | Grams |
| --- | --- |
| Water | 233 |
| n-butyl methacrylate | 25 |
| Emulsion Polymer Stabilizer 1 | 25 |

The contents of the reactor were brought to reflux. At the point of reflux, water, 27.5 g; and VA-044 (Wako Chemicals), 0.68 g were added. In a separate flask, Feed 1 (water, 561 g; n-butylmethacrylate, 225 g; Emulsion Polymer Stabilizer 1 solution, 142 g) was intimately mixed using an Eppenbach homogenizer. Feed 1 was then added to the reaction flask over a period of 100 min. Upon complete addition of Feeds 1 and 2, the contents in the reaction flask were kept at reflux for another 60 min. after which a mixture of water, 12.5 g; and VA-044 ,0.68 g; was added to the reaction flask. The contents in the reaction flask were kept at reflux for an additional 60 min. and then cooled to room temperature. The resultant emulsion was at 23% solids.

Emulsion 2:

An emulsion of butyl methacrylate/ ethoxytriethyleneglycol methacrylate (20/80) with 10% solids of Emulsion Polymer Stabilizer 2, and 1% of butylmercaptan chain transfer agent was prepared according to the following procedure:

First, a pre-emulsified mixture of butyl methacrylate (100.0 g), ethoxytriethyleneglycol methacrylate (400.0 g), Butylmercaptan (5.0 g), 2 pyrrolidone (65.0 g), Liponic® EG-1 (35.0 g), Emulsion Polymer Stabilizer 2 (390.3 g) and water (259.68 g) was prepared. The ingredients were mixed slowly and then mixed for twenty minutes on a high speed homogenizer.

Next, deionized water (557.5 g), 2-pyrrolidone (67.5 g), Liponic® EG-1 (35.0 g) were added to a resin kettle equipped with a heating mantle, stirrer, N2 inlet thermometer, condenser and addition funnel. The pot was heated to 70° C.

Feed I Pre-emulsified mixture (1255.0 g)

Feed II deionized water (50.0 g), Sodium Bisulfite (0.675 g)

Feed III deionized water (15.75 g), Ammonium Persulfate (1.175 g)

Feed IV deionized water (15.75 g), Ammonium Persulfate (0.25 g)

10% of Feed I, 10% of Feed II, all of Feed III were added to the pot over 1 minute. The remaining 90% of Feed I and 90% of Feed II were fed into the pot over 75 minutes. Approximately halfway during this step ⅓ of Feed IV was added. After the completion of Feed I and Feed II, an additional ⅓ of the Feed IV was added. The reaction was continued for 15 minutes, and the remaining ⅓ of the Feed IV was added. The reaction was continued for additional 120 minutes, the mixture was cooled and filtered.

Emulsion 3:

The emulsion was prepared by slowly adding 637 grams of methyl methacrylate and 63 grams of n-butyl methacrylate to 700 grams of the Emulsion Polymer Stabilizer 3 solution and 315 grams of deionized water in a high speed mixing device (homogenizer). Mixing was continued until a good 45 wt % solids pre-emulsified mixture was formed, approximately 30 minutes. The laboratory scale polymerization occurred in a resin kettle equipped with a dropping funnel containing the pre-emulsified mixture, an air stir, nitrogen inlet and a heating mantle. Deionized water, enough to bring the final product to 25% solids, was added to the kettle. Nitrogen purge was applied and the water heated to 70–72° C. A tenth of the pre-emulsified mixture and a 2% aqueous solution of sodium bisulfite and 0.25% (based upon the weight of the monomer used in the pre-emulsion mixture) ammonium persulfate in the form of an 6.5 wt % aqueous solution were then added to the resin kettle. The temperature rose to 80° C. and this temperature was maintained throughout the polymerization. The remaining preemulsion mixture and the sodium bisulfite solution were added over 75 minutes. The total bisulfite added was 0.14% based on monomer concentration. A duplicate aqueous ammonium persulfate solution was prepared and added in three parts, the first being at the mid point of the pre-emulsified mixture and sodium bisulfite additions, the second at the end of those additions and the third part fifteen minutes later. The latex was held at 80–85° C. for an additional 120 minutes, then cooled and filtered.

Two cyan inks were prepared having the following composition:

| | Amount (grams) | |
| --- | --- | --- |
| Ingredient | Control 1 | Example 1 |
| Dispersion 1 | 6.0 | 6.0 |
| 2-Ethyl-2-Hydroxymethyl-1,3-propanediol | 7.2 | 7.2 |
| Deionized water | 26.8 | 18.8 |
| Emulsion Polymer Stabilizer 1 | — | 8.0 |

Draw downs of each of the above inks were made on Gilbert Bond paper. The resistance of the image to water was obtained at various time intervals by dripping deionized water onto the image. The amount of colorant that washes out of the image is rated on a rating scale of 0–5. A rating of 0 indicates good waterfastness where no detectable amount of colorant washed out of image, whereas a rating of 5 indicates that a high degree colorant was washed out of the image. Results are summarizes below.

| | Time After Drawdown | | |
| --- | --- | --- | --- |
| Sample | 5 min | 4 hr | 24 hr |
| Control 1 | 4 | 4 | 4 |
| Example 1 | 3 | 2 | 1 |

The above table illustrates that the addition of emulsion polymer improves the waterfastness of the image.

EXAMPLE 2

Inks were prepared by mixing the following ingredients with magnetic stirring over 10–15 minutes:

| | Parts | |
| --- | --- | --- |
| Ingredient | Control 2 | Example 4 |
| Pigment Dispersion 2 | 20 | 20 |
| 2-pyrrolidone | 9 | 9 |
| Liponics ® EG-1 | 5 | 5 |
| Deionized water | 66 | 66 |
| Emulsion 2 | — | 3.6 |

The inks were jetted out of a Hewlett Packard DeskJet printer in a pattern of seven parallel ⅛ inch solid black lines, spaced ⅛ inch apart. Image quality and pen performance were excellent. The images were left 5 minutes and then marked with a commercial yellow highlighter pen. Black smear onto the non-imaged portions of the paper was evaluated subjectively on a scale of 1–5, where 1 is no smear and 5 is severe smear). Results are shown below.

| Sample | Smear |
| --- | --- |
| Control 2 | 5 |
| Example 2 | 1 |

EXAMPLE 3

Inks were prepared from the following ingredients. The pigment and dispersant were first mixed to form a pigment dispersion followed by mixing with the other ingredients to form an ink.

| Ingredient | Grams |
|---|---|
| Endurophthal ® Blue GF pigment (BT-617-D)* | 4.5 |
| Benzylmethacrylate//Methacrylic acid, 13//10 | 3.0 |
| Emulsion 3 at about 25% solids | 36.3 |
| Zonyl ® FS-310 Fluorocarbon surfactant (DuPont Co.) | 2.0 |
| Surfynol ® DF-695 (Air Products, Allentown, PA) | 0.04 |
| Deionized water | 54.16 |

*Cookson Pigment, Inc., Newark, NJ

Control 3

The procedure described for Example 2 was repeated except that Emulsion 3 was prepared using sodium lauryl sulfate (Duponol® WAQE, WITCO Chemical) at 10 wt % solids as a substitute for Emulsion Polymer Stabilizer 3.

Testing:

Ink samples from Control 3 and Example 3 were run on a continuous ink jet printing device using a Scitex Digital Printing (SDP) printhead, using a binary deflection mode. After 100 hours, Control 3 exhibited poor droplet stability, whereas Example 3 had good drop stability and was stable for longer periods of time (at least about 200 hours).

What is claimed is:

1. An ink jet ink comprising:
   (a) an aqueous carrier medium;
   (b) a colorant; and
   (c) an additive consisting essentially of a mixture of an emulsion polymer and a structured polymer selected from the group consisting of block polymers and graft polymers, wherein the emulsion polymer comprises monomers selected from the group consisting of:
      (1) acrylic and methacrylic monomers; vinyl monomers; maleic acid; maleic anhydride; styrene; itaconic acid; N-vinyl pyrrolidone; acrylamides; and methacrylamides;
      (2) hydrophilic monomer having the formula $CH_2=C(X)(Y)'$, wherein X is H or $CH_3$ and Y' is $C(O)OH$, $C(O)NR_2R_3$, $C(O)OR_4NR_2R_3$, $C(O)OR_5$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups; and
      (3) crosslinking monomer.

2. The ink composition of claim 1 wherein the acrylic and methacrylic monomers are selected from the group consisting of methyl methacrylate, ethyl methacrylate, propyl methacrylate, n-butyl methacrylate, hexyl methacrylate, 2-ethylhexyl methacrylate, octyl methacrylate, lauryl methacrylate, stearyl methacrylate, phenyl methacrylate, hydroxyethyl methacrylate, hydroxypropyl methacrylate, ethoxytriethylene glycol methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethyl-siloxyethyl acrylate, glycidyl acrylate, p-tolyl acrylate, sorbyl acrylate, methacrylic acid, acrylic acid, dimethylaminoethyl methacrylate, diethylaminoethyl methacrylate, t-butylaminoethyl methacrylate, dimethylaminoethyl acrylate and diethylaminoethyl acrylate.

3. The ink composition of claim 1 wherein the crosslinking monomer selected from the group consisting of ethylene glycol dimethacrylate and ethylene glycol triacrylate.

4. The ink composition of claim 1 wherein said colorant comprises a pigment and a block copolymer, and wherein the ink composition comprises approximately 0.1 to 8% by weight pigment, 0.1 to 8% by weight block copolymer, and 94 to 99.8% by weight aqueous carrier medium and 0.01 to 5% solids, by weight of the additive, based upon the total weight of the ink composition.

5. The ink composition of claim 1 wherein the additive is present in the amount of 0.01 to 20% solids by weight, based on the total weight of the ink composition.

6. The ink composition of claim 5 wherein the additive is present in the amount of 0.01 to 5% solids by weight, based on the total weight of the ink composition.

7. The ink composition of claim 5 wherein the additive is present in the amount of 5.1 to 20% solids by weight, based on the total weight of the ink composition.

8. The ink composition of claim 1 wherein said colorant comprises a pigment and a block copolymer dispersant, and wherein the ink composition comprises approximately 0.1 to 8% by weight pigment, 0.1 to 8% by weight block copolymer dispersant, 64 to 94.7% by weight aqueous carrier medium and 5.1 to 20% solids, by weight, of the additive, based upon the total weight of the ink composition.

* * * * *